(12) United States Patent
Liu (10) Patent No.: US 8,824,458 B2
(45) Date of Patent: Sep. 2, 2014

(54) METHOD AND APPARATUS FOR SUPPORTING CALL CONTROL OF CIRCUIT DOMAIN TELEPHONE AND VOIP

(75) Inventor: Yuanyuan Liu, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 218 days.

(21) Appl. No.: 13/381,125

(22) PCT Filed: Aug. 13, 2010

(86) PCT No.: PCT/CN2010/075993
§ 371 (c)(1),
(2), (4) Date: Dec. 28, 2011

(87) PCT Pub. No.: WO2011/029363
PCT Pub. Date: Mar. 17, 2011

(65) Prior Publication Data
US 2012/0120947 A1  May 17, 2012

(30) Foreign Application Priority Data

Sep. 14, 2009  (CN) .......................... 2009 1 0092075

(51) Int. Cl.
*H04L 12/66* (2006.01)
*H04M 3/00* (2006.01)
*H04M 7/00* (2006.01)
*H04M 7/06* (2006.01)

(52) U.S. Cl.
CPC .............. *H04M 3/007* (2013.01); *H04M 7/009* (2013.01); *H04M 7/006* (2013.01); *H04M 7/06* (2013.01); *H04M 7/063* (2013.01)
USPC ............ 370/352; 370/354; 370/355; 370/356

(58) Field of Classification Search
CPC ... H04M 7/00; H04M 7/0003; H04M 7/0006; H04M 7/006; H04M 7/009; H04M 7/06; H04M 7/063; H04L 12/66
USPC .......................................... 370/352, 353–356
See application file for complete search history.

(56) References Cited

U.S. PATENT DOCUMENTS 6,798,767 B1   9/2004  Alexander et al.
8,228,903 B2 *  7/2012  Rosenberg et al. ........... 370/353
(Continued)

FOREIGN PATENT DOCUMENTS

GB           2185657 A       7/1987

OTHER PUBLICATIONS

Sung-Bong Jang et al. "Embedded System Architecture for an FMC Mobile Handset", Fourth International Conference on Networked Computing and Advanced Information Management; DOI 10.1109/NCM.2008.184, pp. 383-390, XP31320171.

(Continued)

*Primary Examiner* — Farah Faroul
(74) *Attorney, Agent, or Firm* — Ling Wu; Stephen Yang; Ling and Yang Intellectual Property (57) ABSTRACT

A method and apparatus for supporting call control of circuit domain telephone and Voice over IP (VoIP) are provided by the present invention, and the apparatus includes a call flow control module, which is for receiving and storing off-hook events and judging if the user makes a circuit domain telephone call or VoIP call according to the number dialed by the user; if making a VoIP call, sending the off-hook event to a VOIP call control module, and sending all the events in the present call to the VoIP call control module for processing; if making a circuit domain telephone call, sending the off-hook event to a circuit domain telephone call control module, and sending all the events in the present call to the circuit domain telephone call control module for processing.

13 Claims, 7 Drawing Sheets

(56) References Cited

U.S. PATENT DOCUMENTS

| | | | |
|---|---|---|---|
| 8,300,531 B2* | 10/2012 | Shamilian et al. | 370/235 |
| 2005/0238160 A1* | 10/2005 | Sunstrum | 379/220.01 |
| 2006/0187904 A1 | 8/2006 | Oouchi | |
| 2007/0230361 A1* | 10/2007 | Choudhury | 370/250 |
| 2007/0280452 A1* | 12/2007 | Bernard | 379/201.01 |
| 2008/0280561 A1* | 11/2008 | Lin | 455/41.2 |
| 2010/0195641 A1* | 8/2010 | Tsai | 370/352 |
| 2010/0329453 A1* | 12/2010 | Mehmood et al. | 380/44 |
| 2012/0243530 A1* | 9/2012 | Rosenberg et al. | 370/352 |
| 2013/0251129 A1* | 9/2013 | Jasper et al. | 379/112.05 |

OTHER PUBLICATIONS

International Search Report for PCT/CN2010/075993 dated Oct. 22, 2010.

* cited by examiner

FIG.1

Prior Art

METHOD AND APPARATUS FOR SUPPORTING CALL CONTROL OF CIRCUIT DOMAIN TELEPHONE AND VOIP

TECHNICAL FIELD

The present invention relates to communication field, and especially relates to an apparatus and a method for supporting call control of circuit domain telephone and VoIP.

BACKGROUND OF THE RELATED ART

With the global popularity of the digital services, various new services are constantly emerging, however people's demand for traditional service is still ardent. Demands of 2G Age such as telephoning and faxing still exist in the 3G Age. Most of the present 3G terminals are able to support the circuit domain telephone, while VoIP (voice over IP) are generally realized by installing application software in PC.

With the gradual development of VoIP, some manufacturers begin to manufacture hardware devices such as terminal adapter (TA) or VoIP gateway, to facilitate the direct connection between the common home phone and these hardware devices for users. The users could choose to use the circuit domain telephone or VoIP by switching.

However, the call control apparatus which is able to support the circuit domain telephone and VoIP at the same time in the prior art, generally implements supporting the circuit domain telephone and VoIP by means of two foreign exchange stations (FXS), of which one FXS is responsible for the circuit domain telephone and the other is responsible for VoIP. The terminal device like that generally has two RJ11 interfaces, i.e. two telephone line interfaces, and one is dedicated to making the circuit domain telephone call and the other one is dedicated to making the VoIP call. The terminal registers online firstly by the user interface (UI), and then registers in the server of SIP (session initiation protocol) at back-end of the network, thereby the VoIP is available.

The following problems exist in the above-mentioned terminal call control apparatus of prior art: the circuit domain telephone and VoIP must correspond to their respective FXS, and the circuit domain telephone and the VoIP are generally distinguished by two RJ11 interfaces that are different in function, and two SLIC (subscriber line interface circuit) chips are required for implementation.

Figure 1:
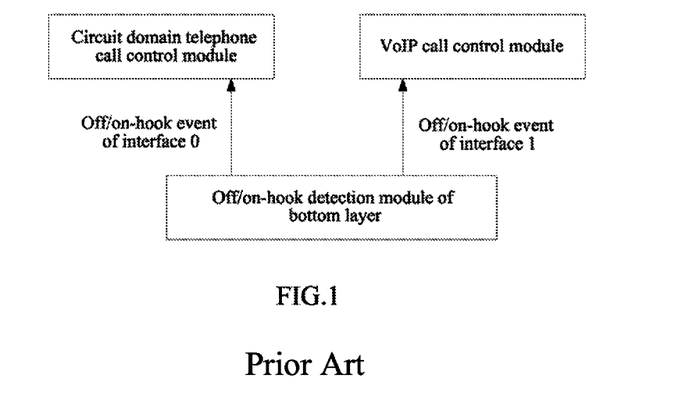
FIG. 1 is a module interaction schematic diagram of the call control apparatus in the related art.

FIG. 1 is a module interaction diagram of the call control apparatus supporting the circuit domain telephone and the VoIP by using two FXSs and two RJ11 interfaces in the related art, and as shown in FIG. 1, in the design of the two FXSs, an off/on-hook detection module of bottom layer judges which interface an event is from and sends the off/on-hook event and timer event to the circuit domain telephone call control module or VoIP call control module of the upper layer. Specifically, in this way, the circuit domain telephone function is realized by the interface 0 of two interfaces, and the VoIP function is realized by the interface 1 of two interfaces; when judging that an off/on-hook event is from interface 0, the off/on-hook detection module of bottom layer sends the off/on-hook event to the circuit domain telephone call control module of the upper layer; when judging that an off/on-hook event is from interface 1, the off/on-hook detection module of bottom layer sends the off/on-hook event to the VoIP call control module of the upper layer. The support to the circuit domain telephone and the VoIP should be implemented by using the two FXSs and by way of distinguishing two RJ11 interfaces with different functions in this method.

Obviously, the implementation of the existing call control apparatus is complicated and costly because of the demand for two SLIC chips.

SUMMARY OF THE INVENTION

The purpose of the present invention is to provide a method and an apparatus for supporting call control of circuit domain telephone and VoIP, which can provide a simple call control apparatus supporting the circuit domain telephone and VoIP, thereby saving the cost.

In order to achieve the above-mentioned purpose, an apparatus for supporting call control of circuit domain telephone and VoIP is provided in the present invention, comprising:

an apparatus for supporting the call control of the circuit domain telephone and VoIP, the apparatus comprising:

an off/on-hook detection module of bottom layer, configured to send a detected off-hook event;

a circuit domain telephone call control module, configured to receive an off-hook event from a call flow control module and all of events in a present call, and process a call event of the circuit domain telephone;

a VoIP call control module, configured to receive an off-hook event from the call flow control module and all of events in a present call, and process the call event of the VoIP;

the call flow control module, configured to receive the off-hook event from the off/on-hook detection module of bottom layer, save the received off-hook event and judge whether a user makes a circuit domain telephone call or a VoIP call according to a number dialed by the user; send the received off-hook event to the VoIP call control module when making the VoIP call, and send all of the events in the present call to the VoIP call control module for processing; send the received off-hook event to the circuit domain telephone call control module when making the circuit domain telephone call, and send all of the events in the present call to the circuit domain telephone call control module for processing.

The call flow control module comprises:

a dialing judgment module, configured to judge whether the number that the user dials after off-hook is a preset prefix number or not; if yes, determine the number dialed by the user is the number of the VoIP; or else, determine the number dialed by the user is the number of the circuit domain telephone.

The call flow control module is further configured to send all of the events in the present call to the VoIP call control module for processing when receiving an incoming call of the VoIP; send all of the events in the present call to the circuit domain telephone call control module for processing when receiving an incoming call of the circuit domain telephone.

The off/on-hook detection module of bottom layer is configured to send a timer event.

The call flow control module is further configured to regularly detect whether a session initiation protocol signaling with a non-null network session domain is received according to the timer event from the off/on-hook detection module of bottom layer, and to determine an incoming call of the VoIP is received when the SIP signaling with the non-null network session domain is received.

The call flow control module is further configured to judge whether a ringing message is received in an on-hook state, and if yes, determine that an incoming call of the circuit domain telephone is received.

The VoIP call control module is further configured to reject the VoIP when the user makes a circuit domain telephone call or a phone isn't on-hook;

the circuit domain telephone call control module is further configured to reject the circuit domain telephone when the user makes a VoIP call or a phone isn't on-hook.

The call flow control module includes:

a mode setting module, configured to set a current call working mode to be a VoIP mode when the user is making the VoIP call or there's an incoming call of the VoIP, and all of the events under the VoIP mode being processed by the VoIP call control module; to set a current call working mode to be a circuit domain telephone mode when the user is making the circuit domain telephone call or there's an incoming call of the circuit domain telephone, and all of the events under the circuit domain telephone mode being processed by the circuit domain telephone call control module; to set a current call working mode to be an unknown mode when there's no dialing or incoming call, and all of the events under the unknown mode being processed by the call flow control module.

A method for supporting the call control of the circuit domain telephone and the VoIP comprises the following steps executed when calling:

A: a call flow control module receives an off-hook event detected by an off/on-hook detection module of bottom layer.

B: the call flow control module saves the off-hook event and judges whether a user makes a circuit domain telephone call or a VoIP call according to a number dialed by the user;

C: if the user makes the VoIP call, the call flow control module sends the off-hook event to a VoIP call control module, and sends all of events in a present call to the VoIP call control module for processing; if the user makes the circuit domain telephone call, the call flow control module sends the off-hook event to the circuit domain telephone call control module, and sends all of events in a present call to the circuit domain telephone call control module for processing.

In the step B, the step of the call flow control module judging whether the user makes the circuit domain telephone call or the VoIP call according to the number dialed by the user comprises:

the call flow control module judges whether the number dialed by the user after off-hook is a preset prefix number or not; if yes, determine that the number dialed by the user is the number of the VoIP; or else, determine that the number dialed by the user is the number of the circuit domain telephone.

In the step C, after the step of the call flow control module sending the off-hook event to the circuit domain telephone call control module if the user makes a circuit domain telephone call, it further comprises:

the call flow control module sending a dialing event of the user to the circuit domain telephone call control module.

The method further includes the steps executed when called as follows:

The call flow control module sends all of the events in the present call to the VoIP call control module for processing when receiving an incoming call of the VoIP;

the call flow control module sends all of the events in the present call to the circuit domain telephone call control module for processing when receiving an incoming call of the circuit domain telephone.

The call flow control module regularly detects whether a session initiation protocol (SIP) signaling with a non-null network session domain is received according to a timer event sent by the off/on-hook detection module of bottom layer, and determines an incoming call of the VoIP is received when the SIP signaling with the non-null network session domain is received.

The call flow control module determines that an incoming call of the circuit domain telephone is received when a ringing message is received in an on-hook state.

The VoIP call control module rejects the VoIP when making a circuit domain telephone call or a phone isn't on-hook; and the circuit domain telephone call control module rejects the circuit domain telephone when making a VoIP call or a phone isn't on-hook.

All of happening events are processed by the call flow control module when there's no call or incoming call.

The technical effect of the present invention is that:

in the present invention, one call flow control module is preset before the circuit domain telephone call control module and VoIP call control module processes the corresponding call event, to judge whether the user is currently making a VoIP call or circuit domain telephone call, and all of events in the present call are sent to the corresponding telephone call control module for processing according to the result of the judgment, and thereby the compatibility between the circuit domain telephone and the VoIP is realized by using one FXS, and the defect that the existing apparatus for supporting the call control of the circuit domain telephone and the VoIP must include two FXSs responsible for the circuit domain telephone and the VoIP respectively is overcome, and one SLIC chip is saved by virtue of the circuit domain telephone and the VoIP may sharing one SLIC chip, thereby saving the cost greatly.

PREFERRED EMBODIMENTS OF THE PRESENT INVENTION

The present invention will be described in detail below in combination with the accompany drawings and specific embodiments, to make the purpose, technical scheme and advantages of the present invention clearer.

Figure 2:
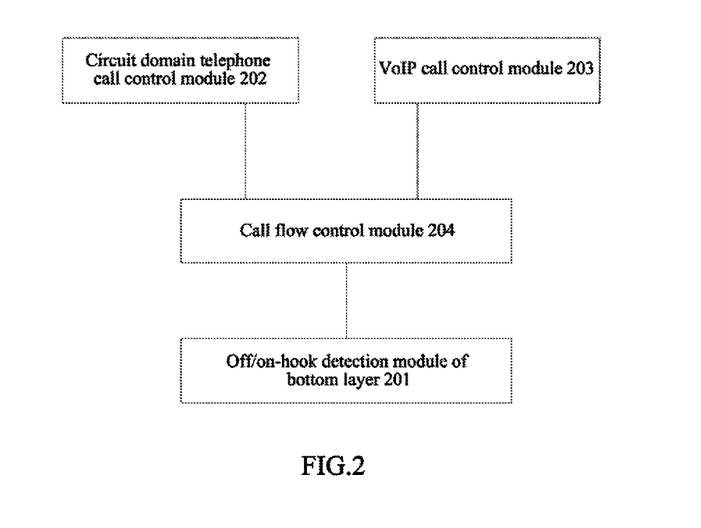
FIG. 2 is a structural schematic diagram of the apparatus for supporting the call control of the circuit domain telephone and the VoIP according to the embodiments of the present invention.

FIG. 2 is a structural schematic diagram of the apparatus for supporting the call control of the circuit domain telephone and the VoIP according to the embodiments of the present invention. As shown in FIG. 2, the apparatus for supporting the call control of the circuit domain telephone and the VoIP provided by the embodiment of the present invention includes:

an off/on-hook detection module of bottom layer 201, configured to send the detected off-hook event;

a circuit domain telephone call control module 202, configured to receive the off-hook event from a call flow control module and all of events during the present call, and process the call event of the circuit domain telephone;

a VoIP call control module 203, configured to receive the off-hook event from the call flow control module and all of events during the present call, and process the call event of the VoIP;

a call flow control module 204, configured to receive the off-hook event from the off/on-hook detection module of bottom layer, save the received off-hook event, and judge whether the user makes the circuit domain telephone call or VoIP call according to the number dialed by the user; to send the received off-hook event to the VOIP call control module if making a VoIP call, and send all the events in the present call to the VoIP call control module for processing; to send the received off-hook event to the circuit domain telephone call control module if making a circuit domain telephone call, and send all the events in the present call to the circuit domain telephone call control module for processing.

Compared with the call control apparatus shown in FIG. 1, the call control apparatus provided by the embodiment of the present invention includes a call flow control module, and judge whether the occurred event is processed by the call flow control module itself or sent to the circuit domain telephone call control module for processing or sent to the VoIP call control module for processing by the call flow control module, for example, by the finite state machine of the call flow control module. Thereby, there is no need to use two FXSs and two RJ11 interfaces to distinguish the circuit domain telephone from the VoIP, realizing the circuit domain telephone and the VoIP by using only one FXS and one RJ11 interface, so that only one SLIC chip is needed and the cost is saved.

Preferably, in the call control apparatus of the embodiment, the off/on-hook detection module of bottom layer is further configured to send the detected on-hook event to the call flow control module.

Preferably, the call flow control module provided by the embodiment of the present invention includes: a dialing judgment module, configured to judge whether the number dialed by the user after off-hook is the preset prefix number or not; if yes, determine the number dialed by the user is the number of the VoIP; or else, determine the number dialed by the user is the number of the circuit domain telephone. Exemplarily, the user dials by pressing buttons, and the dialing judgment module of the call flow control module judges that the number dialed by the user through pressing buttons is the preset prefix number, for example "#", so it is determined that the present dialed number is the number of the VoIP, or else the present dialed number is the number of the circuit domain telephone. In this example, the way of the call initiated by the user is judged by the call flow control apparatus when the user dials the calling prefix number but doesn't finish dialing all the numbers.

Preferably, in the call control apparatus provided by the embodiment of the present invention, the call flow control module is further configured to send all of the events during the present call to the VoIP call control module for processing when receiving the incoming call of the VoIP; and send the all of the events during the present call to the circuit domain telephone call control module for processing when receiving the incoming call of the circuit domain telephone.

Preferably, in the call control apparatus of the embodiment of the present invention, the off/on-hook detection module of bottom layer is further configured to send the timer event; at this time, the call flow control module is further configured to regularly detects whether the SIP signaling with a non-null network session domain is received according to the timer event sent by the off/on-hook detection module of bottom layer, and determine an incoming call of the VoIP is received when the SIP signaling with the non-null network session domain is received.

Preferably, in the call control apparatus provided by the embodiment of the present invention, the call flow control module is further configured to judge whether a ringing message is received in the on-hook state, and if yes, determine an incoming call of the circuit domain telephone is received.

Preferably, in the call control apparatus provided by the embodiment of the present invention, the VoIP call control module is further configured to reject the VoIP when the user is making a circuit domain telephone call or the phone isn't on-hook; the circuit domain telephone call control module is further configured to reject the circuit domain telephone when the user is making a VoIP call or the phone isn't on-hook.

Preferably, in the call control apparatus provided by the embodiment of the present invention, the call flow control module includes: a mode setting module configured to set a current call working mode to be a VoIP mode when the user is making the VoIP call or there's an incoming call of the VoIP, and all of the events under the VoIP mode are processed by the VoIP call control module; to set a current call working mode to be a circuit domain telephone mode when the user is making the circuit domain telephone call or there's an incoming call of the circuit domain telephone, and all of the events under the circuit domain telephone mode are processed by the circuit domain telephone call control module; to set a current call working mode to be an unknown mode when there's no dialing or incoming call, and all of the events under the unknown mode are processed by the call flow control module.

Figure 3:
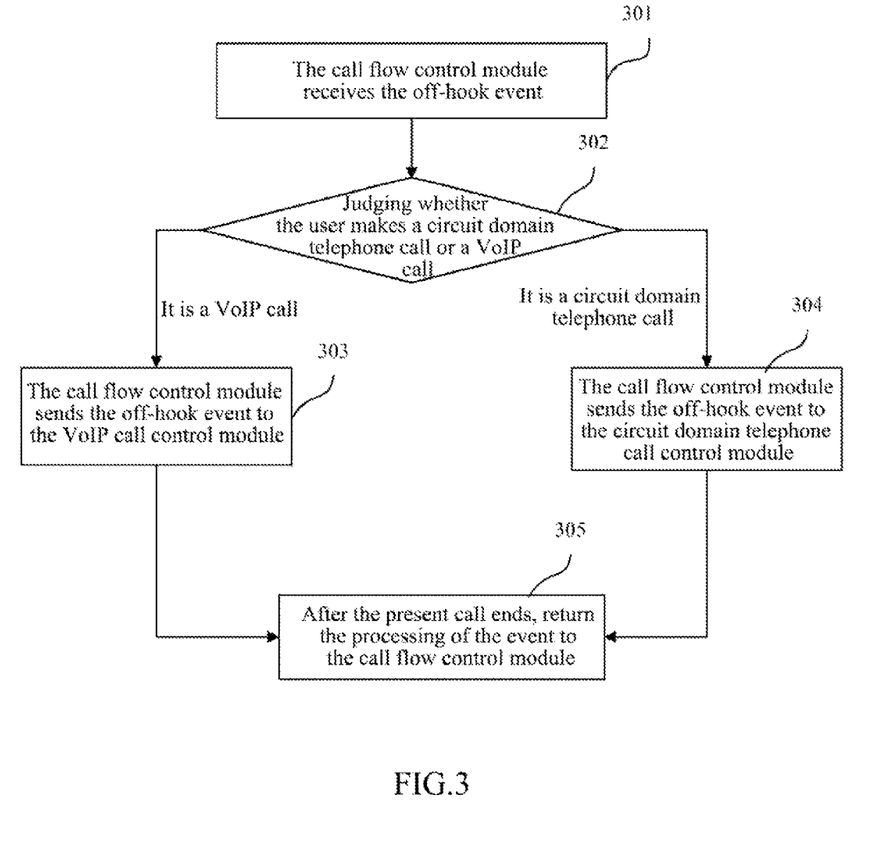
FIG. 3 is a schematic flowchart of method for supporting the call control of the circuit domain telephone and the VoIP according to the embodiments of the present invention.

FIG. 3 is a schematic flowchart of method for supporting the call control of the circuit domain telephone and the VoIP according to the embodiments of the present invention. As shown in FIG. 3, the method includes the steps executed when calling as follows:

Step 301: the call flow control module receives the off-hook event detected by the off/on-hook detection module of bottom layer.

Step 302: the call flow control module saves the received off-hook event, and judges whether the user makes the circuit domain telephone call or the VoIP call according to the number dialed by the user; if it is a VoIP call, proceed to step 303; if it is a circuit domain telephone call, proceed to step 304.

Step 303: the call flow control module sends the off-hook event to the VoIP call control module, and sends all of the events in the present call to the VoIP call control module for processing, and then proceed to step 305.

Step 304: the call flow control module sends the off-hook event to the circuit domain telephone call control module, and sends all of the events in the present call to the circuit domain telephone call control module for processing.

Step 305: the processing of the event is returned to the call flow control module after finishing the present call.

A specific implementation of the call control method provided by the embodiment of the present invention will be described hereafter. In this description, the circuit domain telephone call control module, VoIP call control module and call flow control module of the call control apparatus implementing the call control method will be described firstly.

Figure 6:
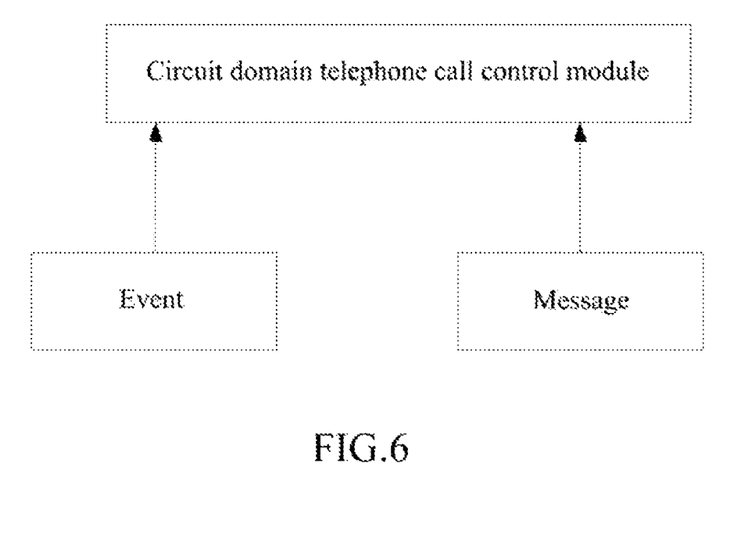
FIG. 6 is a schematic diagram of the circuit domain telephone call control module with the event-driven or message-driven according to the embodiments of the present invention.

The implementation of the circuit domain telephone is a method of state variation based on the event-driven. FIG. 6 is a schematic diagram of the circuit domain telephone call control module with the event-driven or message-driven according to the embodiments of the present invention. As shown in FIG. 6, the variation of the state of the circuit domain telephone controlled by the circuit domain telephone call control module is caused by two ways: the event or receiving a message, wherein the event includes the off/on hook event and the timer event; wherein the above-mentioned message includes the ringing message, outgoing message, message of active hanging up, message of passive hanging up and the like, and these messages also control the variation of the state of the circuit domain telephone.

Figure 4:
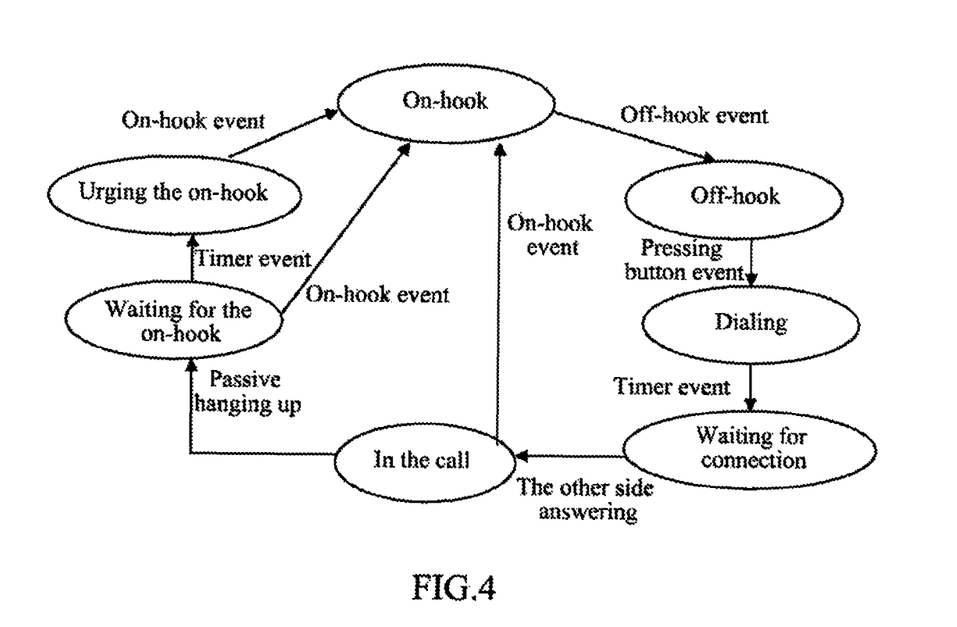
FIG. 4 is a migration diagram of the calling state of the circuit domain telephone call control module according to the embodiments of the present invention.
Figure 5:
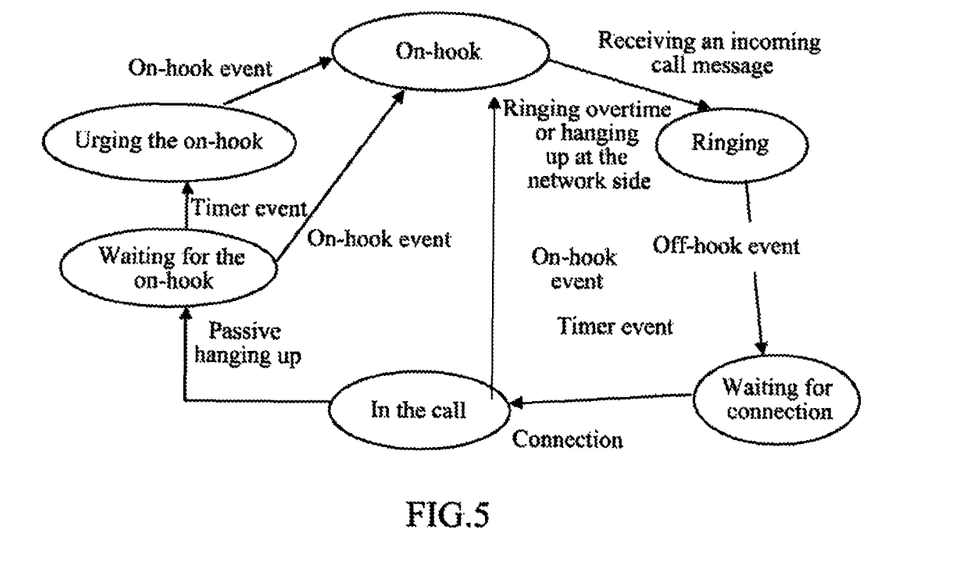
FIG. 5 is a migration diagram of the called state of the circuit domain telephone call control module according to the embodiments of the present invention.

FIG. 4 is a migration diagram of the calling state of the circuit domain telephone call control module according to the embodiments of the present invention. FIG. 5 is a migration diagram of the called state of the circuit domain telephone call control module according to the embodiments of the present invention. As shown in FIG. 4 and FIG. 5, the key variable of the circuit domain telephone call control module is the call state variable, the possible call states include the following nine states: on-hook state, off-hook state, dialing state, state of waiting for connection, ringing state, state of being in the call, state of waiting for hanging up and state of urging the hanging up. In FIG. 4 and FIG. 5, in the state of being in the call, since the state of passive hanging up is transformed to the state of waiting for hanging up, the state of passive hanging up may be caused by receiving a call message. In FIG. 4, in the state of waiting for connection, since the state of the other side answering is transformed to the state of being in the call, the state of the other side answering may be caused by receiving a message. In FIG. 5, in the state of waiting for connection, since the connection state is transformed to the state of being in the call, the connection state may be caused by receiving a message. When the circuit domain telephone call is in a certain state, all of the events or the messages are sent to the event processing function under the state for processing, which may causes a variation of the call state variable and certain actions. The call state is initially the on-hook state, and at this time the state will be transformed to the off-hook state due to off-hook; if there's a ringing when on-hook, the call state will migrates to the ringing state, and at this time the call state after off-hook will migrate to the state of waiting for connection. The above-mentioned event processing function under the corresponding state is same as that in the prior art, which will not be discussed herein.

Figure 7:
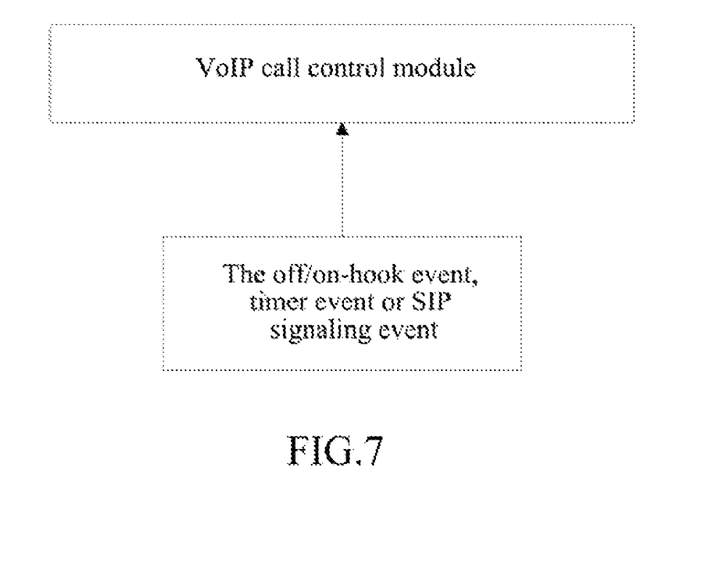
FIG. 7 is a schematic diagram of the VoIP call control module with the event-driven according to the embodiments of the present invention.

FIG. 7 is a schematic diagram of the VoIP call control module with the event-driven according to the embodiments of the present invention. As shown in FIG. 7, the implementation ways of the VoIP call control module and the circuit domain telephone call control module are different, and the VoIP call control module is driven purely by an event. The types of events that drive the VoIP call control module are classified into the following two: the off/on hook event, timer event; and SIP signaling event. Whether the event is the off/on hook event or the SIP signaling event may be judged by the content definition of the event.

In the schemes of call control apparatus with two FXSs of the related art, the circuit domain telephone call control module and the VoIP call control module are distinguished by different interfaces. For example, if the interface corresponding to the circuit domain telephone FXS is 0 and the interface corresponding to the VoIP FXS is 1, take the interface number of this event as the value of the domain, and the events with the interface number 0 are all sent to the circuit domain telephone call control module for processing, the events with interface number 1 are all sent to the VoIP call control module for processing. In the call flow control module in the embodiment of the present invention, the event will not be sent to the circuit domain telephone call control module or the VoIP call control module for processing when off-hook, but the processing procedure of the finite state machine of the call flow control module is added in this position, and by certain judgment and operation, determine whether the event after off-hook is sent to the circuit domain telephone call control module, the VoIP call control module, or processed by the call flow control module itself.

One key call mode global variable is added to the call flow control module provided by the embodiment of the present invention, the possible value of which may be the unknown mode, circuit domain telephone mode and VoIP mode, and the value of the variable determines which module the event received by the call flow control module will be sent to for processing, and the respective corresponding events are sent to the call flow control module, the circuit domain telephone call control module and the VoIP call control module. When there is not any communication or incoming call, the call flow control system will be in the unknown mode, and all of the events will be sent to the call flow control module for processing; when making a circuit domain telephone call or there is an incoming call of the circuit domain telephone, the call flow control system will be in the circuit domain telephone mode, and all of the events will be sent to the circuit domain telephone call control module for processing; when making a VoIP call or there is an incoming call of the VoIP, the call flow control system will be in the VoIP mode, and all of the events will be sent to the VoIP call control module for processing. Another key variable of call flow control module is the call state variable, the probable value of which may be the on-hook state, off-hook state, state of waiting for hanging up and state of urging the hanging up, and the variable defines the state value of the present call state of the call flow control module.

A method for the call control apparatus realizing various examples according to the embodiments of the present invention is described hereafter by examples such as calling, called, active hanging up, passive hanging up and the mutually exclusive call and so on. Wherein, the called example includes answering the incoming call and terminating the incoming call.

Figure 8:
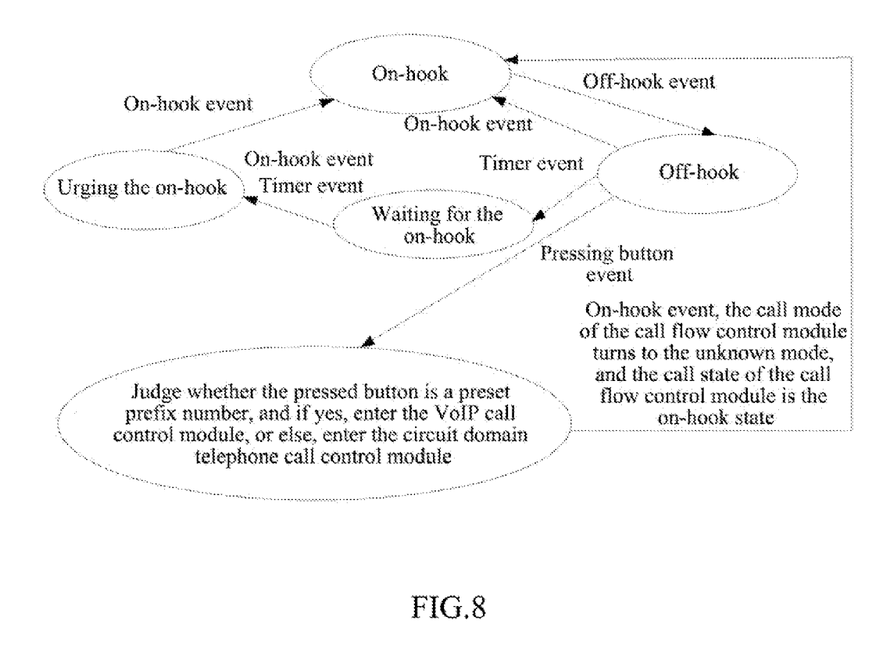
FIG. 8 is a migration diagram of the calling state of the call flow control module according to the embodiments of the present invention.
Figure 9:
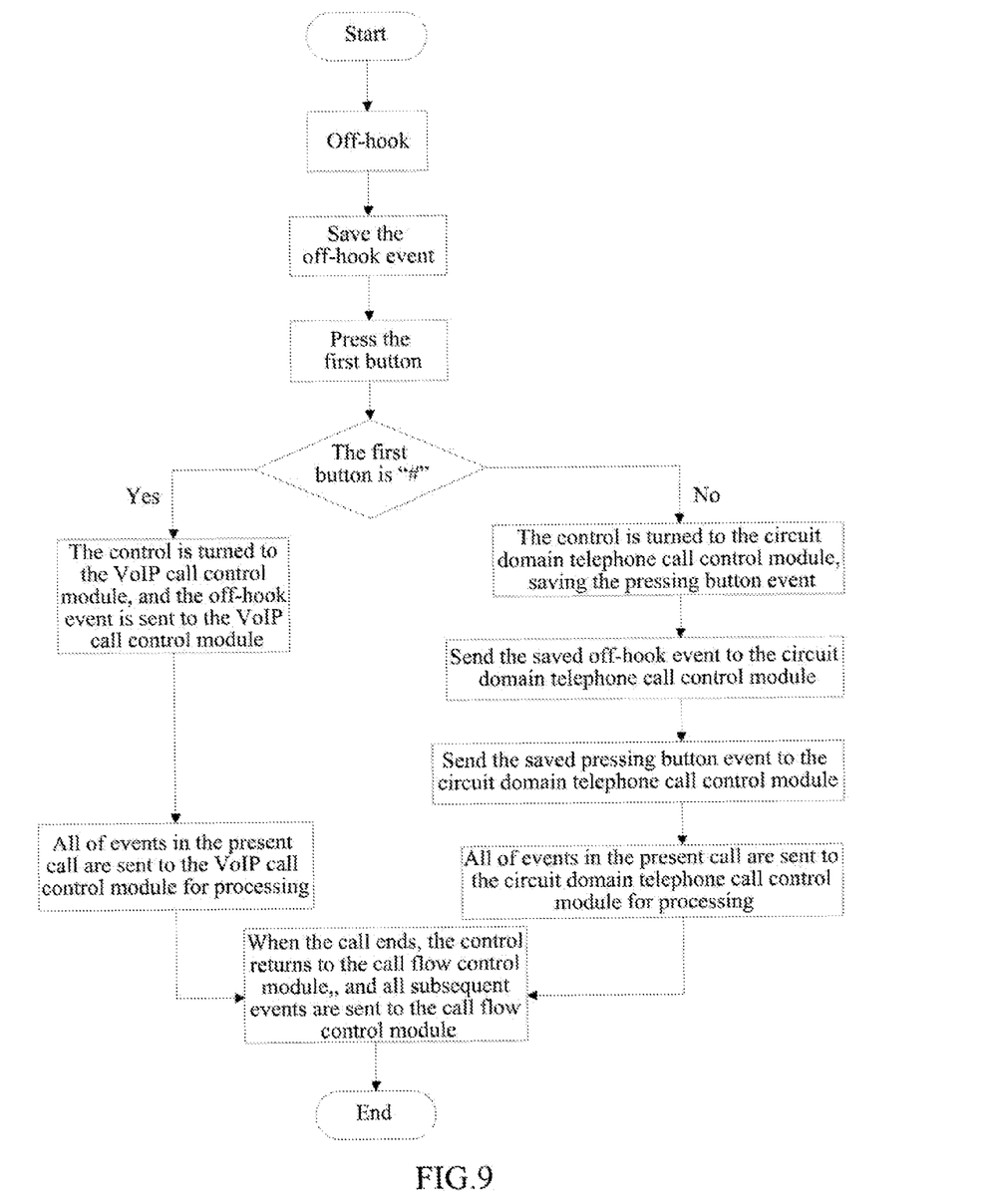
FIG. 9 is a schematic diagram of the procedure of the calling call control in the call control method according to the embodiments of the present invention.

The calling example is shown in FIG. 8 and FIG. 9:

FIG. 8 is a migration diagram of the calling state of the call flow control module according to the embodiments of the present invention. FIG. 9 is a schematic diagram of the procedure of the calling call control in the call control method according to the embodiments of the present invention. In combination with FIG. 8 and FIG. 9, in the method for realizing the call control by using the call control apparatus provided by the embodiment of the present invention, the procedure of calling includes the following steps of:

Firstly, carry out the off-hook and the apparatus is still in the unknown mode at this time, and the off-hook event will be saved after the off-hook, the unknown mode will continue if no button is pressed at this time;

Then, the user presses several buttons in the off-hook state of the unknown mode, to judge whether the dialed numbers include the preset prefix number; if yes, the saved off-hook event is sent to the VoIP call control module, and the call mode variable of the call flow control system is set to VoIP mode so that the subsequent events are sent to the VoIP call control module for processing; if the dialed numbers don't include the preset prefix number, the event of pressing buttons is saved at first, and then the off-hook event is sent to the circuit domain telephone call control module for processing, and at last the saved event of pressing buttons is sent to the circuit domain telephone call control module for processing, and the call mode of the call flow control system is set to circuit domain telephone mode so that the subsequent events are sent to the circuit domain telephone call control module for processing;

Exemplarily, as shown in FIG. 9, the preset prefix number is "#", and after the user presses the first button in the off-hook state of the unknown mode, judge whether the first button is "#" or not; if yes, the control turns to the VoIP call control module, and the off-hook event is sent to the VoIP call control module; otherwise, the control turns to the circuit domain telephone call control module, and the event of pressing buttons is saved, and the saved off-hook event is sent to the circuit domain telephone call control module, and the saved event of pressing buttons is sent to the circuit domain telephone call control module;

then, all of events which occur before the present call ends are processed by the module that the step 2 finally turns to;

When the user hangs up, the call ends, and the call mode of the call flow control module is set to unknown mode, and the call state of the call flow control module is set to on-hook state, and all the subsequent events are sent to the call flow control module for processing.

Figure 10:
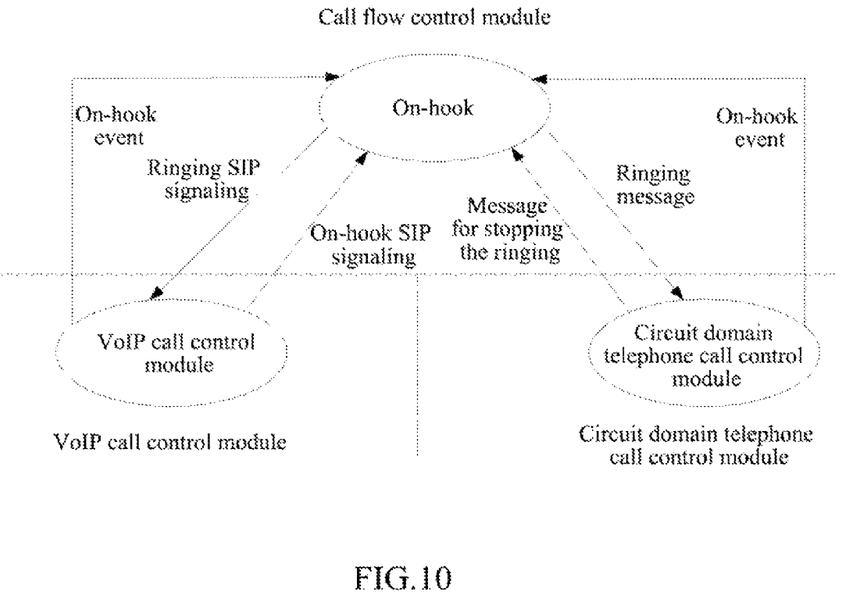
FIG. 10 is a processing schematic diagram of the call flow control module when called in the call control method according to the embodiments of the present invention.

The called example is shown in FIG. 10:

FIG. 10 is a processing schematic diagram of the call flow control module when called in the call control method according to the embodiments of the present invention. The called is classified into the circuit domain telephone incoming call and VoIP incoming call, and the phone will ring when there's an incoming call. The implementation ways of the circuit domain telephone ringing and VoIP ringing are different, though both are ringing. As shown in FIG. 10, the circuit domain telephone ringing means that the call state of circuit domain telephone is transformed from the on-hook state to ringing state, which is caused by a message, while the VoIP ringing means that a ring is generated because a ringing SIP signal is received.

When an incoming call of the circuit domain telephone is detected in the call flow control module, all of the subsequent events are sent to the circuit domain telephone call control module for processing, and the judgment condition is: the call state variable of the circuit domain telephone is the ringing state, and the call state of the call flow control module is the on-hook state. If the condition is met, the call mode is set to circuit domain telephone mode.

The detection of an incoming call of the VoIP is realized based on the regular detection of the timer event. The off/on-hook detection module of bottom layer sends the timer event to the call flow control module, and triggers the call flow control module to detect regularly whether there is an incoming call of VoIP. When an incoming call of VoIP is detected in the call flow control module, the call mode is set to VoIP mode, so that all of the subsequent events are sent to the VoIP call control module for processing. There is a network session domain, that is a dialog domain, in the SIP signaling, which saves the content of the session. When the value of dialog is not null, it indicates that there is a SIP session, in other words, the value of dialog being not null indicates that there is an incoming call of VoIP or in a VoIP call. By the detection in the call flow control module, the call mode is set to VoIP mode when the value of dialog is not null.

Ringing termination includes the ringing termination of circuit domain telephone and the ring termination of VoIP. As shown in FIG. 10, when the ringing of circuit domain telephone terminates, a message for stopping ringing will be received, and after the message for stopping ringing is received, the call mode is set to unknown mode so that the subsequent events are processed by the call flow control module. The condition of stopping the incoming call of VoIP is that the call state of the call flow control module is the on-hook state and the SIP signaling for hanging up, that is the SIP signaling with the dialog domain being null, is received, and exemplarily, the SIP signaling with the pointer of dialog being null is received.

The examples of active hanging up includes: the processing of the active hanging up performed by the circuit domain telephone call control module and the VoIP call control module are both that judge a on-hook event is received. Each variable of the call flow control module needs to be restored firstly after each module finishes processing the on-hook event, and then the call mode is set to unknown mode so that the subsequent events are processed by the call flow control module.

Examples of the passive hanging up include: a dial tone is broadcast in the respective module after the circuit domain telephone and VoIP are hung up passively, and at this time the phone can be hung up. The processing way is: each variable of the call flow control module is restored firstly, and the call mode is set to unknown mode secondly so that the subsequent events are processed by the call flow control module.

Example of the mutually exclusive call includes: the mutually exclusive call herein refers that an incoming call of VoIP must be rejected when making a circuit domain telephone call and an incoming call of circuit domain telephone must be rejected when making a VoIP call.

Wherein, that the network side rejects an incoming call of circuit domain telephone during a circuit domain telephone call has already been processed in the circuit domain telephone call control module, and rejecting an incoming call of VoIP during a VoIP call has already been processed in the VoIP call control module, which will not be described in detail herein.

Rejecting an incoming call of VoIP during a circuit domain telephone call is implemented by adding a handling mechanism in the VoIP call control module. A VoIP call needs to be rejected when making a circuit domain telephone call or the phone isn't on-hook, therefore the VoIP call should be rejected when the following conditions are met: the call mode is in the circuit domain mode, or the call mode is in the unknown mode while the call state of the call flow control module is not the on-hook state.

Rejecting the incoming call of circuit domain telephone during a VoIP call is implemented by adding a handling mechanism in the circuit domain telephone call control module. A circuit domain telephone call should be rejected when making a VoIP call or the phone isn't on-hook. Therefore the circuit domain telephone call needs to be rejected when the following conditions are met: the call mode is in the VoIP mode, or the call mode is in the unknown mode while the call state of the call flow control module is not the on-hook state.

In the present invention, one finite state machine of the call flow control module is preset before the finite state machine of the circuit domain telephone call control module and the finite state machine of the VoIP call control module, to judge whether the user is currently making a VoIP call or circuit domain telephone call, and all of events in the present call are sent to the corresponding telephone call control module for processing according to the result of the judgment, and thereby the compatibility between the circuit domain telephone and the VoIP is realized by using one FXS, and the defect that the existing apparatus for supporting the call control of the circuit domain telephone and the VoIP must include two FXSs responsible for the circuit domain telephone and the VoIP respectively is overcome.

The above description is only preferred embodiments of the present invention, and it should be noted that those skilled in the technical field could make several improvements and variations without departing from the principle of the present invention, and these improvements and variations also should be considered as falling into the protection scope of the present invention.

What is claimed is:

1. An apparatus for supporting call control for both circuit domain telephone and Voice over Internet Protocol (VoIP), the apparatus comprising:
    an off/on-hook detection module, configured to send detected off-hook events;
    a circuit domain telephone call control module, configured to receive off-hook events and all events during the call associated with the off-hook events from a call flow control module, and process incoming/outgoing call events of the circuit domain telephone;
    a VoIP call control module, configured to receive off-hook events and all events during the call associated with the off-hook events from a call flow control module, and process incoming/outgoing call events of the VoIP;
    the call flow control module, configured to receive off-hook events from the off/on-hook detection module, save the received off-hook events and judge whether a user makes a circuit domain telephone incoming/outgoing call or a VoIP incoming/outgoing call according to the number dialed by the user;
    when the incoming/outgoing call is the VoIP call, to send the received off-hook events and all events during the call associated with the off-hook events to the VoIP call control module;
    when the incoming/outgoing call is the circuit domain telephone call, to send the received off-hook event and all events during the call associated with the off-hook events to the circuit domain telephone call control module;
    wherein, the off/on-hook detection module is further configured to send a timer event; and
    the call flow control module is further configured to regularly detect whether a Session Initiation Protocol (SIP) signaling with a non-null network session domain is received according to the timer event from the off/on-hook detection module, and to determine that the VoIP incoming call is received when the SIP signaling with the non-null network session domain is received.

2. The apparatus according to claim 1, wherein the call flow control module comprises:
    a dialing judgment module, configured to judge whether the number dialed by the user after off-hook is a preset prefix number or not; if yes, determine the number dialed by the user is the number of the VoIP; or else, determine the number dialed by the user is the number of the circuit domain telephone.

3. The apparatus according to claim 1, wherein
    the call flow control module is further configured to judge whether a ringing message is received in an on-hook state, and if yes, determine that the circuit domain telephone incoming call is received.

4. The apparatus according to claim 1, wherein
    the VoIP call control module is further configured to reject the VoIP incoming/outgoing call when a phone call is a circuit domain telephone incoming/outgoing call or the phone is not on-hook;
    the circuit domain telephone call control module is further configured to reject the circuit domain telephone incoming/outgoing call when a phone call is a VoIP incoming/outgoing call or the phone is not on-hook.

5. The apparatus according to claim 1, wherein the call flow control module comprises:
    a mode setting module, configured to set a current call working mode to be a VoIP mode when there are the VoIP incoming/outgoing calls, and all events under the VoIP mode are processed by the VoIP call control module;
    to set the current call working mode to be a circuit domain telephone mode when there are the circuit domain telephone incoming/outgoing calls, and all events under the circuit domain telephone mode are processed by the circuit domain telephone call control module;
    to set the current call working mode to be an unknown mode when there is no incoming/outgoing call, and all events under the unknown mode are processed by the call flow control module.

6. The apparatus according to claim 1, wherein,
    after the circuit domain telephone call control module processed the events of an incoming/outgoing call of the circuit domain telephone, or the VoIP call control module processed the events of an incoming/outgoing call of the VoIP, a call state of the call flow control module is set as an on-hook state.

7. A method for supporting both call control of circuit domain telephone and Voice over Internet Protocol (VoIP), the method comprising following steps executed when making outgoing calls:
    A: a call flow control module receiving an off-hook event detected by an off/on-hook detection module;
    B: the call flow control module saving the off-hook event and judging whether a user makes a circuit domain telephone incoming/outgoing call or a VoIP incoming/outgoing call according to a number dialed by the user;
    C: if the user makes the VoIP incoming/outgoing call, the call flow control module sending the off-hook event to a VoIP call control module, and sending all events during the call associated with the off-hook events to the VoIP call control module for processing;
    if the user makes the circuit domain telephone incoming/outgoing call, the call flow control module sending the off-hook event to the circuit domain telephone call control module, and sending all events during the call associated with the off-hook events to the circuit domain telephone call control module for processing;
    wherein, the call flow control module regularly detects whether a Session Initiation Protocol (SIP) signaling with a non-null network session domain is received according to a timer event sent by the off/on-hook detection module, and determines the VoIP incoming call is received when the SIP signaling with the non-null network session domain is received.

8. The method according to claim 7, wherein in the step B, the step of the call flow control module judging whether the user makes the circuit domain telephone incoming/outgoing call or the VoIP incoming/outgoing call according to the number dialed by the user comprises:
- the call flow control module judging whether the number dialed by the user after off-hook is a preset prefix number or not; if yes, determining that the number dialed by the user is the number of the VoIP; if not, determining that the number dialed by the user is the number of the circuit domain telephone.

9. The method according to claim 8, wherein
in the step C, after the step of the call flow control module sending the off-hook event to the circuit domain telephone call control module if the user makes the circuit domain telephone incoming/outgoing call, the step C further comprises:
- the call flow control module sending a dialing event of the user to the circuit domain telephone call control module.

10. The method according to claim 7, wherein
when a ringing message is received in an on-hook state, the call flow control module determines that the circuit domain telephone incoming call is received.

11. The method according to claim 7, wherein:
the VoIP call control module rejects the VoIP incoming/outgoing call when a phone call is a circuit domain telephone incoming/outgoing call or the phone is not on-hook; and
the circuit domain telephone call control module rejects the circuit domain telephone incoming/outgoing call when the phone call is a incoming/outgoing VoIP call or the phone is not on-hook.

12. The method according to claim 7, wherein
all events are processed by the call flow control module when there are no outgoing calls and incoming calls.

13. The method according to claim 7, further comprising:
after the circuit domain telephone call control module processed the events of an incoming/outgoing call of the circuit domain telephone, or the VoIP call control module processed the events of an incoming/outgoing call events of the VoIP, setting a call state of the call flow control module as an on-hook state.

* * * * *